United States Patent
Lauber et al.

(10) Patent No.: US 11,994,499 B2
(45) Date of Patent: May 28, 2024

(54) COATED FLOW PATH COMPONENTS FOR CHROMATOGRAPHIC EFFECTS

(71) Applicant: Waters Technologies Corporation, Milford, MA (US)

(72) Inventors: Matthew A. Lauber, North Smithfield, RI (US); Martin Gilar, Franklin, MA (US); Mathew H. DeLano, Needham, MA (US); Michael Donegan, Charlton, MA (US)

(73) Assignee: Waters Technologies Corporation

( * ) Notice: Subject to any disclaimer, the term of this patent is extended or adjusted under 35 U.S.C. 154(b) by 3 days.

(21) Appl. No.: 16/800,454

(22) Filed: Feb. 25, 2020

(65) Prior Publication Data
US 2020/0271629 A1 Aug. 27, 2020

Related U.S. Application Data

(60) Provisional application No. 62/811,029, filed on Feb. 27, 2019.

(51) Int. Cl.
*G01N 30/26* (2006.01)
*B01D 15/18* (2006.01)
*B01D 15/22* (2006.01)
*B01D 15/36* (2006.01)
*B01D 15/38* (2006.01)
*G01N 30/02* (2006.01)

(52) U.S. Cl.
CPC ......... *G01N 30/26* (2013.01); *B01D 15/1878* (2013.01); *B01D 15/22* (2013.01); *B01D 15/361* (2013.01); *B01D 15/3847* (2013.01); *G01N 2030/027* (2013.01)

(58) Field of Classification Search
CPC .. G01N 30/50; G01N 30/56; G01N 2030/567; B05D 2202/00; C23C 16/045; C23C 14/046; B01D 15/20; B01D 15/206; B01D 15/22
See application file for complete search history.

(56) References Cited

U.S. PATENT DOCUMENTS

| 4,029,583 | A | * | 6/1977 | Ho Chang | B01J 20/103 252/184 |
| 2009/0206034 | A1 | * | 8/2009 | Nakajima | B01J 20/3276 528/34 |
| 2010/0051464 | A1 | * | 3/2010 | Nakayama | G01N 27/44704 204/603 |
| 2013/0306558 | A1 | * | 11/2013 | Shalliker | G01N 30/6017 210/635 |
| 2014/0376081 | A1 | * | 12/2014 | Yokokawa | G02F 1/167 359/296 |
| 2015/0024152 | A1 | * | 1/2015 | Carr | B01D 15/22 428/34.1 |
| 2019/0086371 | A1 | | 3/2019 | Lauber et al. | |

FOREIGN PATENT DOCUMENTS

| EP | 2144057 A1 | 1/2010 |
| EP | 2826884 A1 | 1/2015 |
| GB | 2486679 A | 6/2012 |
| WO | 2005052544 A2 | 6/2005 |
| WO | 2017040623 A1 | 3/2017 |
| WO | 2019165249 A1 | 8/2019 |

OTHER PUBLICATIONS

"Chromatography Applications, Applications Note: A Chromatographic View of a SilcoNert@ treated Sample Flow Path." Retrieved on May 26, 2020 from https://theanalyticalscientist.com/fil eadmin/tas/issues/App Notes/07217-silcotek-app-note-supplied.pdf.

* cited by examiner

*Primary Examiner* — Ryan B Huang
(74) *Attorney, Agent, or Firm* — WOMBLE BOND DICKINSON; Deborah M. Vernon; Ricardo Joseph (57) ABSTRACT

The present disclosure relates to the determination of analytes in a sample using chromatography. The present disclosure provides methods of separating an analyte from a sample. The method includes introducing a sample comprising the analytes into a chromatographic system. The chromatographic system has a flow path disposed in an interior of the chromatographic system, at least a portion of the flow path having an active coating, and a chromatographic column having a stationary phase material in an interior of the chromatographic column that facilitates separation of the analytes in the sample through interaction with at least one analyte in the sample. The active coating is selected to interact with at least one analyte in the sample through (1) a repulsive force, (2) a secondary interaction, or (3) a retention mechanism distinct from the interaction with the stationary phase material.

5 Claims, 2 Drawing Sheets

FIG. 1

| COATING # | DEPOSITED MATERIAL | ALTERNATIVE COATING ABBREVIATION | ALKYL SILYL COATING REAGENT | CHARGE MODIFIER ($R^C$) REAGENT | HYDROPHOBICITY MODIFIER ($R^B$) REAGENT |
|---|---|---|---|---|---|
| 1 | BIS(TRICHLOROSILYL)ETHANE FOLLOWED BY TRIMETHOXY SILYL PROPYL METHYL PHOSPHONATE | C2-PHOSPHO-NATE | | | N/A |
| 2 | BIS(TRICHLOROSILYL)ETHANE FOLLOWED BY TRIMETHOXY SILYL PROPYL METHYL PHOSPHONATE FOLLOWED BY n-DECYL TRICHLOROSILANE | C2-PHOSPHO-NATE -C10 | | | |
| 3 | BIS(TRICHLOROSILYL)ETHANE FOLLOWED BY N,N-(DIETHYLAMINOPROPYL) TRIMETHOXYSILANE | C2-DEAP | | | N/A |
| 4 | BIS(TRICHLOROSILYL)ETHANE FOLLOWED BY N,N-(DIETHYLAMINOPROPYL) TRIMETHOXYSILANE FOLLOWED BY n-DECYL TRICHLOROSILANE | C2-DEAP-C10 | | | |
| 5 | BIS(TRICHLOROSILYL)ETHANE FOLLOWED BY N,N-(DIETHYLAMINOPROPYL) TRIMETHOXYSILANE FOLLOWED BY N-(3-TRIETHOXYSILYLPROPYL) GLUCONAMIDE | C2-DEAP-GLUCO | | | |

FIG. 2

COATED FLOW PATH COMPONENTS FOR CHROMATOGRAPHIC EFFECTS

CROSS-REFERENCE TO RELATED APPLICATIONS

This application claims priority to and benefit of U.S. provisional patent application No. 62/811,029 filed on Feb. 27, 2019 and entitled "Coated Flow Path Components for Chromatographic Effects," the entire contents of which is hereby incorporated by reference.

FIELD OF THE TECHNOLOGY

The present disclosure relates to methods of separating an analyte(s) from a sample. More particularly, the present disclosure relates to active coatings that are vapor deposited onto at least a portion of a flow path (wetted surfaces) of a chromatographic system to interact with at least one analyte in the sample through a repulsive force, a secondary interaction, or a retention mechanism distinct from the interaction with the stationary phase material.

BACKGROUND

Analytes that interact with metal have often proven to be very challenging to separate. The desire to have high pressure capable chromatographic systems with minimal dispersion has required that flow paths decrease in diameter and be able to withstand increasingly high pressures at increasingly fast flow rates. As a result, the material of choice for chromatographic flow paths is often metallic in nature. This is despite the fact that characteristics of certain analytes, for example, biomolecules, proteins, glycans, peptides, oligonucleotides, pesticides, bisphosphonic acids, anionic metabolites, and zwitterions like amino acids and neurotransmitters, are known to have unfavorable interactions, so called chromatographic secondary interactions, with metallic surfaces.

The proposed mechanism for metal specific binding interactions requires an understanding of Lewis theory of acid-base chemistry. Pure metals and metal alloys (along with their corresponding oxide layers) have terminal metal atoms that have characteristics of a Lewis acid. More simple, these metal atoms shown a propensity to accept donor electrons. This propensity is even more pronounced with any surface metal ions bearing a positive charge. Analytes with sufficient Lewis base characteristics (any substance that can donate non-bonding electrons) can potentially adsorb to these sites and thus form problematic non-covalent complexes. It is these substances that are defined as metal-interacting analytes.

For example, analytes having phosphate groups are excellent polydentate ligands capable of high affinity metal chelation. This interaction causes phosphorylated species to bind to the flow path metals thus reducing the detected amounts of such species, a particularly troublesome effect given that phosphorylated species are frequently the most important analytes of an assay.

Other characteristics of analytes can likewise pose problems. For example, carboxylate groups also have the ability to chelate to metals, albeit with lower affinities than phosphate groups. Yet, carboxylate functional groups are ubiquitous in, for example, biomolecules, giving the opportunity for cumulative polydentate-based adsorptive losses. These complications can exist not only on peptides and proteins, but also glycans. For example, N-glycan species can at times contain one or more phosphate groups as well as one or more carboxylate containing sialic acid residues. Additionally, smaller biomolecules such as nucleotides and saccharides, like sugar phosphates, can exhibit similar behavior to the previously mentioned N-glycan molecules. Moreover, chromatographic secondary interactions can be especially problematic with biomolecules, particularly larger structures, because they have a capacity (via their size and structural order) to form microenvironments that can adversely interact with separation components and flow path surfaces. In this case, a biomolecule or analyte having larger structures, can present structural regions with chemical properties that amplify a secondary interaction to the material of a flow path. This, combined with the cumulative metal chelation effects curtails the overall effective separation of biomolecules, pesticides, bisphosphonic acids, anionic metabolites, and zwitterions like amino acids and meurotransmitters.

An alternative to using metal flow paths is to use flow paths constructed from polymeric materials, such a polyether ether ketone (PEEK). PEEK tubing, like most polymeric materials, is formed by means of an extrusion process. With polymeric resin, this manufacturing process can lead to highly variable internal diameters. Accordingly, PEEK column hardware yields unfavorable differences in the retention times as can be observed from switching between one column and the next. Often, this variation can be a factor of three higher than a metal constructed column. In addition, the techniques for fabricating polymer based frits are not yet sufficiently optimized to afford suitably rugged components for commercial HPLC columns. For example, commercially available PEEK frits tend to exhibit unacceptably low permeability.

Ongoing efforts to reduce chelation and unwanted secondary chromatographic interactions of analytes with metal (or other) chromatographic surfaces in an effort to facilitate chromatographic separation having higher resolutions are therefore needed.

SUMMARY

One solution to reducing unwanted secondary chromatographic interactions of analytes with metal (or other) chromatographic surfaces is to use an alkylsilyl coating to minimize interactions between analytes of the metal flow path (making the flow path inert to the analytes of interest) as detailed in U.S. patent application Ser. No. 16/133,089 filed on Sep. 17, 2018.

As described here, it is also beneficial to modify flow path components with an organosilica functionality that exhibits chemical properties that have an effect on the chromatographic separation. These so-called 'active' coatings can introduce a Coulombic repulsive effect with an analyte to shield them from interacting with the substrate material (e.g., metal, plastic, etc.) of the flow path in a way that negatively affects the chromatographic separation. In addition, an 'active' coating can be produced that adds an enhancing selectivity to a separation by way of a subtle secondary interaction. Moreover, an 'active' coating can be prepared that affords an entirely orthogonal retention mechanism, which facilitates the adsorption, partitioning, and desorption of analytes in a process distinct from that achieved with the stationary phase of a column.

The present disclosure provides a number of advantages over current systems and methodology. For example, the technology of the present disclosure not only reduces unwanted interactions between analytes and metallic or polymeric surfaces, but modifies the surfaces of a chromatographic flow path in such a way as to positively affect the separation, for example, by enhancing selectivity. In this way, the chromatographic separation can be effected and enhanced not just by the chromatographic stationary phase material but also by other chromatographic surfaces that interact with the analytes.

In one aspect, the technology relates to a method of separating analytes in a sample. The method includes introducing a sample comprising the analytes into a chromatographic system. The chromatographic system includes a flow path disposed in an interior of the chromatographic system where at least a portion of the flow path having an active coating, and a chromatographic column having a stationary phase material in an interior of the chromatographic column that facilitates separation of the analytes in the sample through interaction with at least one analyte in the sample. The active coating is selected to interact with at least one analyte in the sample through (1) a repulsive force, (2) a secondary interaction, or (3) a retention mechanism distinct from the interaction with the stationary phase material. The method can include one or more of the embodiments described herein.

In some embodiments, the analyte and the active coating are negatively charged. The analyte and active coating can be positively charged.

In some embodiments, the active coating is applied to the flow path by vapor deposition. The active coating can be applied to a frit. The frit can be positioned at an outlet of the chromatographic column. In some embodiments, the frit is positioned at an inlet of the chromatographic column. The chromatographic column can have two frits, one positioned at the outlet of the chromatographic column and one positioned at the inlet of the chromatographic column.

In some embodiments, the secondary interaction is ion exchange partitioning.

In another aspect, the technology relates to a chromatographic device for separating analytes in a sample. The device includes a sample injector having a sample injection needle for injecting the sample into the mobile phase, a sample reservoir container in fluid communication with the sample injector, a chromatography column downstream of the sample injector, the chromatography column having fluid connectors, and fluid conduits connecting the sample injector and the chromatography column. In some embodiments, the fluid connectors are connect post-column detector(s) and devices. Interior surfaces of the fluid conduits, sample injector, sample reservoir container, and chromatography column form a fluidic flow path having wetted surfaces. At least a portion of the wetted surfaces of the fluidic flow path are coated with an alkylsilyl coating having the Formula I:

(I)

Each X is independently selected from $(C_1-C_6)$alkoxy, —NH$(C_1-C_6)$alkyl, —N$((C_1-C_6)$alkyl$)_2$, OH, OR$^A$, R$^B$, R$^C$, R$^D$ and halo. R$^A$ represents a point of attachment to the interior surfaces of the fluidic system and at least one X is OR$^A$. R$^B$ is absent or represents a hydrophobicity modifier. R$^C$ represents a charge modifier and at least one X is R$^C$. R$^D$ is absent, a chelator, or a crown ether. Y is a bridging moiety selected from $(C_1-C_{20})$alkyl, —O[(CH$_2$)$_2$O]$_{1-20}$—, —$(C_1-C_{10})$[NH(CO)NH$(C_1-C_{10})$]$_{1-20}$—, or —$(C_1-C_{10})$[alkylphenyl$(C_1-C_{10})$alkyl]$_{1-20}$—. The device can include one or more of the embodiments described herein.

In some embodiments, the charge modifier has the same charge as at least one analyte in the sample. The charge modifier (R$^C$) can be attached to Formula I by a silyl ether moiety and has a composition selected from the group consisting of n-cyclohexylaminomethyl silyl, n-(2-aminoethyl)-3-aminopropyl silyl, n-cyclohexyl-3-aminopropyl silyl, n-(2-aminoethyl)-3-aminopropylmethyl silyl, n-cyclohexylaminomethyl silyl, bis(silylpropyl)-n-methylamine, 3-aminopropyl diisopropyl silyl, (3-aminopropyl) silyl, n,n-diethyl-3-aminopropyl silyl, propanesulfonic acid silyl, N-(hydroxyethyl)-N,N-bis(silyl propyl)amine, 2-(4-pyridylethyl) silyl, tris(silylmethyl)amine, carboxyethyl silyl, and silyl propyl methyl phosphonate.

In some embodiments, the charge modifier (R$^C$) is

Z is independently selected from $C_1-C_6$)alkoxy, —NH$(C_1-C_6)$alkyl, —N$((C_1-C_6)$alkyl$)_2$, OH, halo, or an attachment point to Formula I. At least one Z is the attachment point to Formula I.

In some embodiments, the charge modifier (R$^C$) is

Z is independently selected from $C_1-C_6$)alkoxy, —NH$(C_1-C_6)$alkyl, —N$((C_1-C_6)$alkyl$)_2$, OH, halo, or an attachment point to Formula I. At least one Z is the attachment point to Formula I.

In some embodiments, the charge modifier (R$^C$) is a quaternary amine.

The alkylsilyl coating of Formula I can be at least 100 Å thick. In some embodiments, the charge modifier (R$^C$) has a surface coverage between about 0.01 μmol/m$^2$ and about 10 μmol/m$^2$. The charge modifier (R$^C$) can have a surface coverage between about 0.02 μmol/m$^2$ and about 1 μmol/m$^2$.

In some embodiments, the hydrophobicity modifier (R$^B$) is present. The hydrophobicity modifier (R$^B$) can have a net neutral charge. The hydrophobicity modifier (R$^B$) can be attached to Formula I by a silyl ether moiety and can have a composition selected from the group consisting of n-decyl silyl, trimethyl silyl, n-propyl silyl, t-butyl dimethyl silyl, 4-phenylbutyl silyl, n-octadecyl diisobutyl silyl, 6-phenylhexyl silyl, n-octadecyl silyl, n-methyl-O-methyl carbamate silyl, phenyl silyl, diphenyl methyl silyl, sulfobetaine silyl, carboxybetaine silyl, glycidoxy propyl silyl, hydrolyzed glycidoxypropyl silyl, and N-(propyl) gluconamide silyl.

In some embodiments, the hydrophobicity modifier ($R^B$) is

Z is independently selected from $C_1$-$C_6$)alkoxy, —NH($C_1$-$C_6$)alkyl, —N(($C_1$-$C_6$)alkyl)$_2$, OH, halo, or an attachment point to Formula I. At least one Z is the attachment point to Formula I.

In some embodiments, the hydrophobicity modifier ($R^B$) is

Z is independently selected from $C_1$-$C_6$)alkoxy, —NH($C_1$-$C_6$)alkyl, —N(($C_1$-$C_6$)alkyl)$_2$, OH, halo, or an attachment point to Formula I. At least one Z is the attachment point to Formula I.

In some embodiments, the alkylsilyl coating of Formula I is at least one X is the charge modifier ($R^C$), wherein $R^C$ is and at least one X is the hydrophobicity modifier ($R^B$), wherein $R^B$ is Z is independently selected from $C_1$-$C_6$)alkoxy, —NH($C_1$-$C_6$)alkyl, —N(($C_1$-$C_6$)alkyl)$_2$, OH, halo, or an attachment point to Formula I. At least one Z is the attachment point to Formula I.

In some embodiments, the alkylsilyl coating of Formula I is at least one X is the charge modifier ($R^C$), wherein $R^C$ is and at least one X is the hydrophobicity modifier ($R^B$), wherein $R^B$ is Z is independently selected from $C_1$-$C_6$)alkoxy, —NH($C_1$-$C_6$)alkyl, —N(($C_1$-$C_6$)alkyl)$_2$, OH, halo, or an attachment point to Formula I. At least one Z is the attachment point to Formula I.

In some embodiments, the alkylsilyl coating of Formula I is at least one X is the charge modifier ($R^C$), wherein $R^C$ is and at least one X is the hydrophobicity modifier ($R^B$), wherein $R^B$ is Z is independently selected from $C_1$-$C_6$)alkoxy, —NH($C_1$-$C_6$)alkyl, —N(($C_1$-$C_6$)alkyl)$_2$, OH, halo, or an attachment point to Formula I. At least one Z is the attachment point to Formula I.

In some embodiments, the hydrophobicity modifier ($R^B$) has a surface coverage between about 0.01 μmol/m$^2$ and about 10 μmol/m$^2$. The hydrophobicity modifier ($R^B$) can have a surface coverage between about 0.03 μmol/m$^2$ and about 0.9 μmol/m$^2$. In some embodiments, the hydrophobicity modifier has a surface coverage between about 0.5 μmol/m$^2$ and about 3 μmol/m$^2$.

The chromatography column can include a frit having a wetted surface coated with the alkylsilyl coating of Formula I. The frit can be positioned at an outlet of the chromatography column. In some embodiments, the frit is positioned at an inlet of the chromatography column. The chromatographic column can have two fits, one positioned at the outlet of the chromatographic column and one positioned at the inlet of the chromatographic column In some embodiments, the hydrophobicity modifier ($R^B$) is present.

The device can also include a detector downstream of the chromatography column, wherein the fluidic flow path further comprises the detector. The detector can be a mass spectrometer and the fluidic flow path include wetted surfaces of an electrospray needle.

In some embodiments, $R^D$ is present. $R^D$ can be the chelator and the chelator can be ethylenediaminetetraacetic acid. In some embodiments, $R^D$ is the chelator and the chelator is etidronic acid. $R^D$ can be the crown ether and the crown ether can be selected from the group consisting of 18-crown-6, 12-crown-4, 15-crown-5, dibenzo-18-crown-6, and diaza-18-crown-6.

In another aspect, the technology features a method of separating a sample comprising an anionic compound. The method includes introducing the sample comprising the anionic compound to a fluidic system including a flow path disposed in an interior of the fluidic system, wherein at least a portion of the flow path comprising an alkylsilyl coating having the Formula I:

(I)

Each X is independently selected from ($C_1$-$C_6$)alkoxy, —NH($C_1$-$C_6$)alkyl, —N(($C_1$-$C_6$)alkyl)$_2$, OH, O$R^A$, $R^B$, $R^C$, $R^D$ and halo. $R^A$ represents a point of attachment to the interior surfaces of the fluidic system and at least one X is O$R^A$. $R^B$ is absent or represents a hydrophobicity modifier. $R^C$ represents a negatively-charged modifier and at least one X is $R^C$. $R^D$ is absent, a chelator, or a crown ether. Y is a bridging moiety selected from ($C_1$-$C_{20}$)alkyl, —O[(CH$_2$)$_2$O]$_{1-20}$—, —($C_1$-$C_{10}$)[NH(CO)NH($C_1$-$C_{10}$)]$_{1-20}$-, or —($C_1$-$C_{10}$)[alkylphenyl($C_1$-$C_{10}$)alkyl]$_{1-20}$-. The method also includes eluting the sample through the fluidic system, wherein the anionic compound is repelled by the negatively-charged modifier ($R^C$), and isolating the anionic compound. The method can include one or more of the embodiments described herein.

In some embodiments, the anionic compound is a nucleic acid. The anionic compound can be an oligonucleotide.

In some embodiments, the alkylsilyl coating of Formula I is and the negatively-charged modifier ($R^C$) is In another aspect, the technology features a method of separating a sample comprising peptides. The method includes introducing the sample comprising peptides into a chromatography column having a hydrophobic stationary phase disposed within the chromatography column and a frit at an outlet of the chromatography column, wherein the frit is coated with an alkylsilyl coating having the Formula I:

(I)

Each X is independently selected from $C_1$-$C_6$)alkoxy, —NH ($C_1$-$C_6$)alkyl, —N(($C_1$-$C_6$)alkyl)$_2$, OH, O$R^A$, $R^B$, $R^C$, $R^D$ and halo. $R^A$ represents a point of attachment to the interior surfaces of the fluidic system and at least one X is O$R^A$. $R^B$ represents a hydrophobicity modifier and at least one X is $R^B$. $R^C$ represents a charge modifier and at least one X is $R^C$. Y is a bridging moiety selected from ($C_1$-$C_{20}$)alkyl, —O[(CH$_2$)$_2$O]$_{1-20}$—, —($C_1$-$C_{10}$)[NH(CO)NH($C_1$-$C_{10}$)]$_{1-20}$-, or —($C_1$-$C_{10}$)[alkylphenyl($C_1$-$C_{10}$)alkyl]$_{1-20}$-. The charge modifier has a surface coverage of between about 0.03 μmol/m$^2$ to about 0.9 μmol/m$^2$ and the hydrophobicity modifier has a surface coverage of between about 0.5 μmol/m$^2$ to about 3 μmol/m$^2$. The method also includes eluting the sample through the chromatography column and isolating the peptides. The method can include one or more of the embodiments described herein.

In some embodiments, the charge modifier is N,N-(diethylaminopropyl)silyl. The hydrophobicity modifier can be n-decyl silyl.

In some embodiments, the peptides include Asp and iso ASP isomeric peptide pair. The method can also include partitioning the Asp and iso ASP isomeric peptide pair on the coated frit.

In some embodiments, the hydrophobic stationary phase comprises a bridged ethylene hybrid C18 stationary phase.

The sample can include trypsinized immunoglobulin. In some embodiments, the trypsinized immunoglobulin is trastuzumab.

In another aspect, the technology includes a method of separating a sample comprising proteins. The method includes introducing the sample comprising proteins into a chromatography column having a hydrophobic stationary phase disposed within the chromatography column and a frit at an inlet of the chromatography column, wherein the frit is coated with an alkylsilyl coating having the Formula I:

Each X is independently selected from $C_1$-$C_6$)alkoxy, —NH($C_1$-$C_6$)alkyl, —N(($C_1$-$C_6$)alkyl)$_2$, OH, OR$^A$, R$^B$, R$^C$, R$^D$ and halo. R$^A$ represents a point of attachment to the interior surfaces of the fluidic system and at least one X is OR$^A$. R$^C$ represents a charge modifier and at least one X is R$^C$. Y is a bridging moiety selected from ($C_1$-$C_{20}$)alkyl, —O[(CH$_2$)$_2$O]$_{1-20}$—, —($C_1$-$C_{10}$)[NH(CO)NH($C_1$-$C_{10}$)]$_{1-20}$—, or —($C_1$-$C_{10}$)[alkylphenyl($C_1$-$C_{10}$)alkyl]$_{1-20}$-. The charge modifier has a surface coverage of between about 0.1 μmol/m$^2$ to about 3 μmol/m$^2$. The method also includes eluting the sample through the chromatography column, and isolating the proteins. The method can include one or more of the embodiments described herein.

In some embodiments, the hydrophobic stationary phase includes a bridged ethylene hybrid C4 stationary phase. The charge modifier can be silyl propyl methyl phosphonate.

The method can also include flowing a mobile phase having an ionic strength through the chromatography column such that the proteins are retained on the frit, increasing the ionic strength of the mobile phase to displace a portion of the proteins from the frit, and eluting the displaced proteins through the chromatography column.

The features illustrated or described in connection with one aspect and/or embodiment can be combined with the features of other aspects and/or embodiments. Such modifications and variations are intended to be included within the scope of the present invention.

BRIEF DESCRIPTION OF THE DRAWINGS

The technology will be more fully understood from the following detailed description taken in conjunction with the accompanying drawings, in which.

DETAILED DESCRIPTION

It is critical in liquid chromatography for flow paths and their chemical properties to be given serious consideration. Generally, it is advantageous while designing a flow path to make it inert to sample analytes, given that it is preferred for it to not be of any influence to a separation. Low-bind surfaces are accordingly garnering attention, including organosilica coatings such as those deposited by vapor phase reactions (see, e.g., U.S. patent application Ser. No. 16/133, 089 filed on Sep. 17, 2018). Contrary to these inert, low-bind surfaces, the technology described herein relates to 'active' coatings, i.e., coatings that influence a separation. Flow path components for liquid chromatography can be modified with an organosilica (alkylsilyl) functionality to purposefully exhibit chemical properties of effect to a chromatographic separation. An 'active' coating such as this can introduce a Coulombic repulsive effect with an analyte to shield the analyte from interacting with the substrate material of the flow path. In addition, an 'active' coating can be produced that adds an enhancing selectivity to a separation by way of a secondary interaction. Moreover, an 'active' coating can be prepared that affords an entirely orthogonal retention mechanism, which facilitates the adsorption, partitioning, and desorption of analytes in a process, distinct from that achieved with the stationary phase of a column.

Coatings suitable for achieving these chromatographic effects can be constructed by numerous means. Organosilica (alkylsilyl) is a versatile composition to use in the coating of both metallic and polymeric flow path components, which can range from an injector needle and pre-column heater to post-column tubing, column housings, frits, detector flow cells, and electrospray needles. The organosilica (alkyksilyl) coating can be applied via either gas phase or solution phase reactions and with a host of different silanizing reagents. For example, an alkylsilyl coating can be applied via vapor deposition, which can then be deliberately doped with a charged surface modifier.

In general, a number of aspects of the technology are directed to (1) devices having an alkylsilyl 'active' coating; (2) methods of isolating an analyte in a sample, in particular a metal-interacting analyte; and (3) kits comprising various chromatographic components coated with an alkylsilyl 'active' coating and instructions for use. In some aspects, a coating is used to modify a flow path to address flow path interactions with an analyte and to interact with the analyte so that the chromatographic separation is improved, for example, increasing selectivity of the analyte of interest. That is, the active coating minimizes surface reactions with the metal interacting analyte while at the same time interacting with the analyte to improve separations. The reduction/elimination of the interactions between the analyte and the metal is advantageous because it allows for accurate quantification and analysis of a sample containing a metal-interacting analyte, for example, biomolecules, proteins, glycans, peptides, oligonucleotides, pesticides, bisphosphonic acids, anionic metabolites, and zwitterions like amino acids and neurotransmitters. The biomolecule can be selected from a peptide or peptide fragment, an oligopeptide, a protein, a glycan, a nucleic acid or nucleic acid fragment, a growth factor, a carbohydrate, a fatty acid, and a lipid. In one aspect, the biomolecule is a protein, a peptide, or a glycan. The biomolecule can be a phosphoglycan or a phosphopeptide.

In addition to reducing/eliminating the interactions between the analyte and the metal, the 'active' coating has further advantages in that the coating interacts with the analyte to improve separations. The active coating can improve separations by, for example, actively repelling the analyte from the metallic surfaces, introducing a secondary interaction between the coating and the analyte that enhances selectivity, and/or provides an orthogonal retention mechanism that is different from the retention mechanism of the stationary phase material.

In the present technology, vapor deposited alkylsilyl coatings on wetted surfaces of fluidic systems (e.g., liquid chromatography systems) modify the fluidic flow path to introduce an interaction between the alkylsilyl coating and the analyte(s). As such, they are 'active' coatings (meaning that the analyte(s) of the sample interact with the alkylsilyl coating).

Devices

Figure 1:
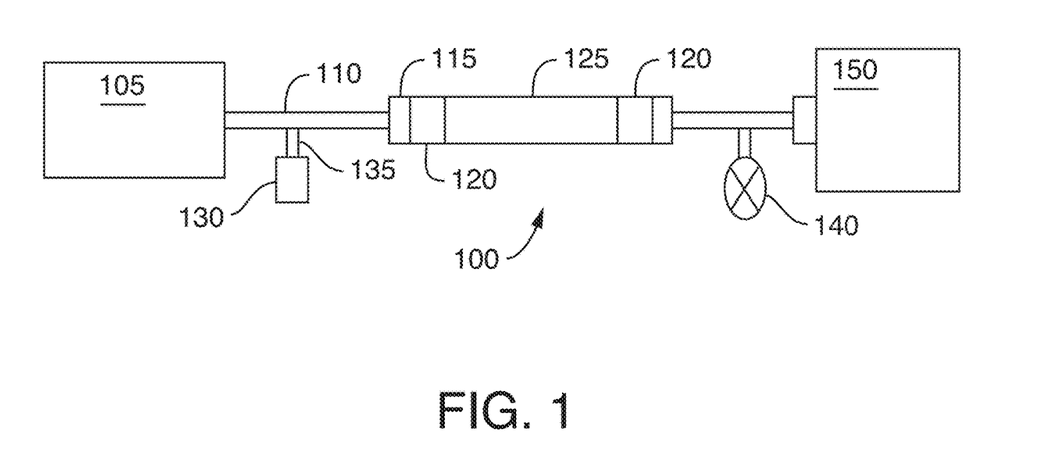
FIG. 1 is a schematic of a chromatographic flow system including a chromatography column and various other components, in accordance with an illustrative embodiment of the technology. A fluid is carried through the chromatographic flow system with a fluidic flow path extending from a fluid manager to a detector.

FIG. 1 is a representative schematic of a chromatographic flow system/device 100 that can be used to separate analytes in a sample. Chromatographic flow system 100 includes several components including a fluid manager system 105 (e.g., controls mobile phase flow through the system), tubing 110 (which could also be replaced or used together with microfabricated fluid conduits), fluid connectors 115 (e.g., fluidic caps), frits 120, a chromatography column 125, a sample injector 135 including a sample injection needle (not shown) to insert or inject the sample into the mobile phase, a vial, sinker, or sample reservoir 130 for holding the sample prior to injection, a detector 150 located downstream of the chromatography column 125, and a pressure regulator 140 for controlling pressure of the flow. The sample reservoir 130 is in fluid communication with the sample injection needle. Interior surfaces of the components of the chromatographic system/device form a fluidic flow path that has wetted surfaces. The fluidic flow path can have a length to diameter ratio of at least 20, at least 25, at least 30, at least 35 or at least 40.

The fluidic flow path can include the detector 150. The detector 150, can be a mass spectrometer. The fluidic flow path can include wetted surfaces of an electrospray needle (not shown).

At least a portion of the wetted surfaces can be coated with an alkyl silyl coating, described in detail herein, selected to interact with the analyte(s) in the sample to improve the separation of the analyte(s) in the sample. The coating can be applied by vapor deposition. As such, methods and devices of the present technology provide the advantage of being able to use high pressure resistant materials (e.g., stainless steel) for the creation of the flow system, but also being able to tailor the wetted surfaces of the fluidic flow path to provide selected interactions between the alkylsilyl coating and the analyte(s) of interest to improve separation.

The alkylsilyl coating can be provided throughout the system from the tubing or fluid conduits 110 extending from the fluid manager system 105 all the way through to the detector 150. The coatings can also be applied to portions of the fluidic fluid path. That is, one may choose to coat one or more components or portions of a component and not the entire fluidic path. For example, the internal portions of the column 125 and its frits 120 and end caps 115 can be coated whereas the remainder of the flow path can be left unmodified. Further, removable/replaceable components can be coated. For example, the vial or sinker 130 containing the sample reservoir can be coated as well as frits 120.

Figure 2:
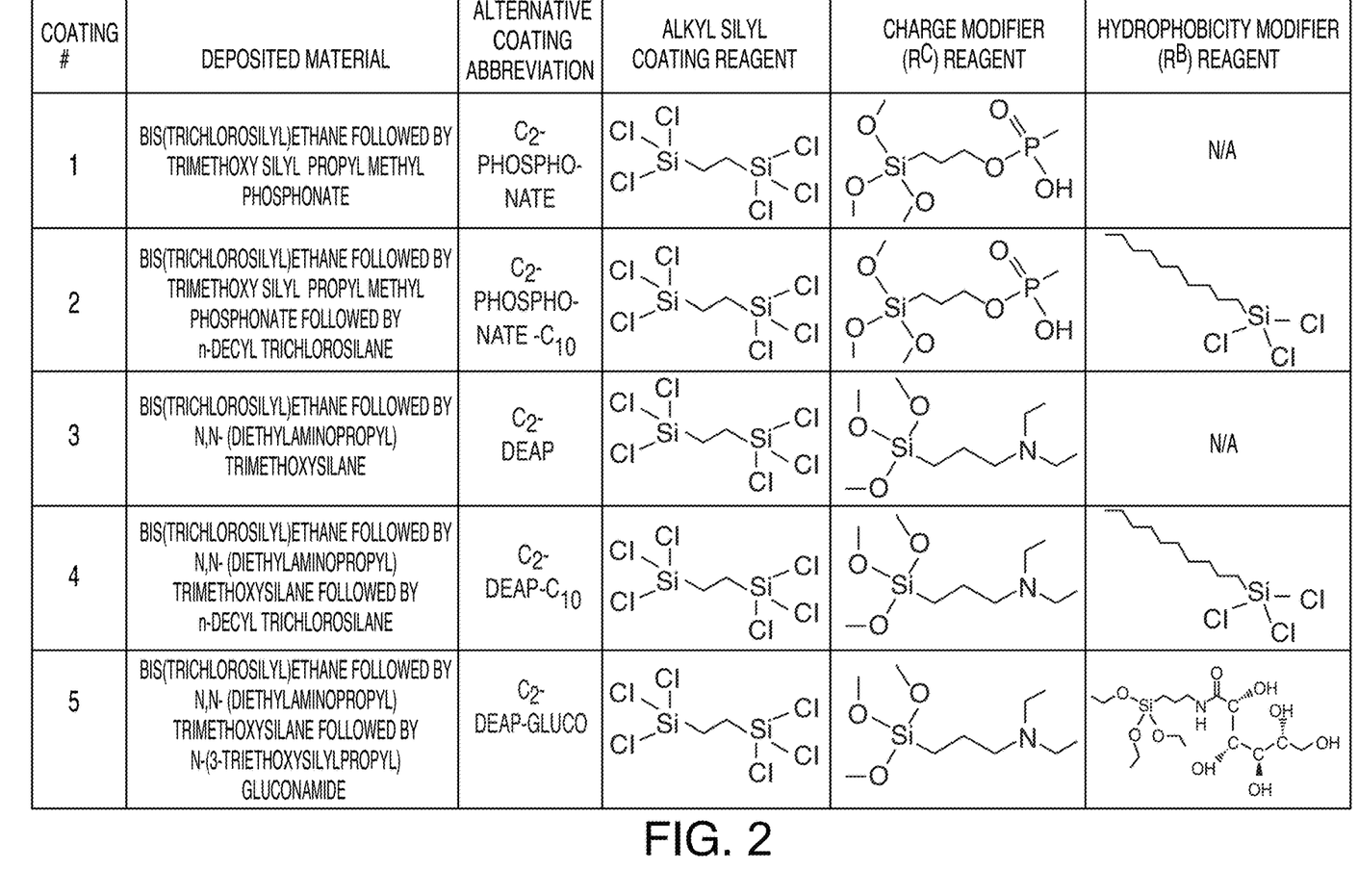
FIG. 2 is a chart showing exemplary embodiments of coatings, in accordance with an illustrative embodiment of the technology.

In some embodiments, one or both frits 120 have a wetted surface that is coated with one of the alkylsilyl coatings described in detail herein (for example the coatings shown in FIG. 2). A frit 120 can be positioned at the inlet or outlet of the column 125. In some embodiments, the column 125 has a frit 120 positioned at both the inlet and outlet of the column 125. In some embodiments, the chromatographic column 125 can be designed such that the inlet and/or outlet frit 120 is replaceable. In this way, if the frit 120 is coated with an alkyl silyl coating described herein, the frit 120 can be easily replaced with a frit having a different alkyl silyl coating to achieve a different effect.

In one aspect, the flow path of the fluidic systems described herein is defined at least in part by an interior surface of tubing. In another aspect, the flow path of the fluidic systems described herein is defined at least in part by an interior surface of microfabricated fluid conduits. In another aspect, the flow path of the fluidic systems described herein is defined at least in part by an interior surface of a column. In another aspect, the flow path of the fluidic systems described herein is defined at least in part by passageways through a frit. In another aspect, the flow path of the fluidic systems described herein is defined at least in part by an interior surface of a sample injection needle. In another aspect, the flow path of the fluidic systems described herein extends from the interior surface of a sample injection needle throughout the interior surface of a column. In another aspect, the flow path extends from a sample reservoir container (e.g. sinker) disposed upstream of and in fluidic communication with the interior surface of a sample injection needle throughout the fluidic system to a connector/port to a detector.

In some embodiments, only the wetted surfaces of the chromatographic column and the components located upstream of the chromatographic column are coated with the alkylsilyl coatings described herein while wetted surfaces located downstream of the column are not coated. The coating can be applied to the wetted surfaces via vapor deposition.

At least a portion of the wetted surfaces of the fluidic flow path are coated with an alkylsilyl coating having Formula I:

Each X is independently selected from $C_1$-$C_6$)alkoxy, —NH($C_1$-$C_6$)alkyl, —N(($C_1$-$C_6$)alkyl)$_2$, OH, OR$^A$, R$^B$, R$^C$, R$^D$ and halo. In some embodiments, X is independently selected from OR$^A$, R$^B$, R$^C$, and R$^D$. $C_1$-$C_6$)alkoxy, —NH($C_1$-$C_6$)alkyl, —N(($C_1$-$C_6$)alkyl)$_2$, OH, and halo are reactive/hydrolysable groups. In some embodiments, these groups provide residual reactive groups where amino>halo>alkoxy as it relates to silane reactivity. In some embodiments, the specific coating that is used (e.g., the specific selection of X in Formula I) depends on the type of chromatographic separation being performed. The goal is to create chemically stable (good longevity) coatings on various materials present in a chromatographic flow path. However, hydrophilic coatings have no interactions in reversed phase liquid chromatography, while hydrophilic coatings can exhibit some retention in hydrophilic interaction chromatography. While one coating may suffice for multiple different chemical separations, different coatings can also be used for different modes of liquid chromatography.

R$^A$ represents a point of attachment to the interior surfaces of the fluidic system and at least one X is OR$^A$. R$^B$ is absent or represents a hydrophobicity modifier. R$^C$ represents a charge modifier and at least one X is R$^C$. R$^D$ is absent, a chelator, or a crown ether. Y is a bridging moiety selected from ($C_1$-$C_{20}$)alkyl, —O[(CH$_2$)$_2$O]$_{1-20}$—, —($C_1$-$C_{10}$)[NH(CO)NH($C_1$-$C_{10}$)]$_{1-20}$—, or —($C_1$-$C_{10}$)[alkylphenyl($C_1$-$C_{10}$)alkyl]$_{1-20}$-. The selection of Y can be dictated by both chemical and physical consideration. While not being limited by theory, short alkyl chains can produce more rigid, mechanically stronger substrates. However, alkyl bridging (Y) groups can yield materials with significant hydrophobicity. Accordingly, heteroatom containing Y groups can be employed. Furthermore, phenyl/aromatic groups can be used to introduce pi electrons that alter the electrostatic density and adsorption properties of the substrate.

Therefore, the alkylsilyl coating of Formula I has at least one X that is $OR^A$, a point of attachment to the interior surfaces of the fluidic system and at least one X that is $R^C$, which represents a charge modifier. The hydrophobicity modifier $R^B$ and the chelator or crown ether $R^D$ can be absent. In some embodiments, the alkylsilyl coating of Formula I has a charge modifier. In some embodiments, the alkylsilyl coating of Formula I has a charge modifier and a hydrophobicity modifier. In some embodiments, the alkylsilyl coating of Formula I has a charge modifier and a chelator or crown ether. In some embodiments, the alkylsilyl coating of Formula I has a charge modifier, a hydrophobicity modifier and a chelator or crown ether.

In other embodiments, the alkylsilyl coating of Formula I has at least one X that is $OR^A$, a point of attachment to the interior surfaces of the fluidic system and at least one X that is $R^C$, which represents a chelator or crown ether. In some embodiments, the alkylsilyl coating of Formula I has a chelator or crown ether and a hydrophobicity modifier.

When used in the context of a chemical formula, a hyphen ("—") indicates the point of attachment. For example, when Y is $-[(C_1-C_{10})\text{alkylphenyl}(C_1-C_{10})\text{alkyl}]_{1-20}-$, that means that Y is connected to one $SiX_3$ via the $(C_1-C_{10})$alkyl and connected to the other $SiX_3$ via the other $(C_1-C_{10})$alkyl. This applies to the remaining variables.

In one embodiment, Y in Formula I is $(C_1-C_{15})$alkyl, $(C_1-C_{12})$alkyl, or $(C_1-C_{10})$alkyl. In some embodiments, Y in Formula I is methyl, ethyl, propyl, isopropyl, butyl, sec-butyl, iso-butyl, t-butyl, pentyl, hexyl, heptyl, nonyl, or decanyl. In other aspect, Y in Formula I is ethyl or decanyl.

In some embodiments, X can be another Y bridging moiety. In this way, the alkylsilyl coating can have more than two Si atoms bridged by two separated Y bridging moieties. When multiple Y bridging moieties are in the alkyl silyl coating, the Y bridging moieties can be the same Y moiety or different Y moieties. Multiple bridging moieties can result in the alkylsily coating being in a straight chain or branched. In addition, an alkylsilyl coating having multiple Y bridging moieties can be hyper-crosslinked with extensive bridging. The first bridging alkylsilyl composition can be highly crosslinked with some surface heterogeneity and mix of bridging moieties and silanols. That surface can then be modified with one or more of the modifiers described herein (e.g., charge modifiers, hydrophobicity modifiers, chelators and/or crown ethers, or surfactants).

In some embodiments, the active alkylsilyl coating is comprised at least in part by Formula I as described herein. In that way, the alkylsilyl coating of Formula I is at least a portion of the coating. The coating could have other Y bridging moieties with multiple modifiers as described herein.

Moreover, when the active alkylsilyl coatings described herein have multiple Y bridging moieties, the coating can be tailored to provide different microporosities and densities. Temperatures, vapor concentrations, and rates of deposition or hydrolysis can be adjusted to alter the porosity, density and thickness of the coating. Denser coatings are advantageous for minimizing ion and liquid transfer. Denser coatings are preferred to mitigate corrosion and to limit long distance interactions between analytes and flow path substrates.

Generally, a bridging silane reagent is first applied to wetted surfaces of the fluidic flow path via vapor deposition to achieve a high build, e.g., greater than about 100 Å thick base layer, resulting in Formula I once deposited onto the wetted surfaces of the fluidic flow path. For example, the thickness can be between about 100 Å to about 1600 Å. The thickness of the coating can be about 100 Å, 200 Å, 300 Å, 400 Å, 500 Å, 600 Å, 700 Å, 800 Å, 900 Å, 1000 Å, 1100 Å, 1200 Å, 1300 Å, 1400 Å, 1500 Å, or 1600 Å. The reagent can be, for example, bis(trichlorosilyl)ethane, bis(3-trimethoxysilylpropyl)-N-methylamine, 1,4-bis(methoxydimethylsilyl)benzene, bis(trimethoxysilylethyl)benzene, 1,8-bis(triethyoxysilyl)octane, or 1,4-bis(triethyoxysilyl)benzene.

In some embodiments a single modifier is used, for example, a single charge modifier. In other embodiment, multiple modifiers are used, for example, multiple charge modifiers or combinations or charge modifiers and hydrophobicity modifiers.

Charge Modifier ($R^C$)

Onto a suitable base layer, a charge modifying salinizing reagent can be applied. These charge bearing surface modifiers are comprised of strong acids/bases or weak acids/bases with a dissociation constant selected in a desirable range of pKa and can include but are not limited to trimethoxy silyl propyl methyl phosphonate and N,N-(diethylaminopropyl) trimethoxysilane. Strong acids can be desirable in some applications and be selected to have a pKa from about −2 to about 2, while other applications are more desirable with week acids have a pKa from about 2 to about 7. Other applications can benefit from weak bases have a pKa from about 7 to 11, while some applications can benefit from strong bases having a pKa from about 11 to about 14. Having surface modification with some pKa (rather than permanent charge) provides an opportunity to discharge the modified surface by pH. This allows the surface to regenerate by simple wash. Alternatively, if the charge is permanent, there is a possibility for retention of sample components of the opposite charge and such contaminants can accumulate on the charged surface and can be difficult to get rid of. By having an option to discharge the surface with pH and remove contaminants retained by charge, the robustness of the analysis can be improved.

Surface modifiers with fixed charges, such as quaternary amines, can also be employed. These surface modifiers can be incorporated in situ during a vapor deposition process or through secondary, liquid phase reactions that are broadly employed by those skilled in the art. In some embodiments, liquid phase reactions can include multiple steps so as to build the desired charge modifying moiety. For example for separation of nucleic acids or phosphopeptides that are negatively charged, the surface charge can be negative. In such case, the analytes are repelled from the surface and have no losses due to non-specific adsorption.

The charge modifier ($R^C$) can have the same charge as at least one analyte in the sample. When the charge modifier has the same charge as at least one analyte in the sample, the charge modifier introduces a Coulombic repulsive effect with the sample(s) having the same charge (i.e., like charges repel). This repulsive effect shields the analyte(s) from interacting with the substrate material of the flow path. The selection of an appropriate charge modifier can also depend on practical limitations, for example whether a suitable silane reagent can be sourced, or if it is to be synthesized, it is can be vaporized or made to be soluble in a suitable solvent system to carry out a reaction. In addition, the stability of the resulting coating should be considered. For example, a strong base that is also a nucleophile can be problematic because it can self catalyze its hydrolytic degradation.

In addition to introducing a Coulombic repulsive effect with the sample(s) having the same charge, charge modifiers can also facilitate multidimensional chromatography by strongly retaining a class of analytes by a retention mechanism that is orthogonal to that of an implemented liquid chromatography column. For example, analytes adsorb to a flow path component having an alkylsilyl coating with a charge modifier (e.g., a frit at the entrance of a chromatography column), are eluted to a downstream chromatography column in a gradient or set of discrete mobile phase changes and secondary gradients across the packed bed of the chromatography column are thereafter performed.

The charge modifier can be, for example, any one or more of the following charge modifiers: a quaternary amine, (n,n-diethyl-3-aminopropyl) silyl silyl propyl methyl phosphonate n-cylcohexylaminomethyl silyl n-(2-aminoethyl)-3-aminopropyl silyl n-cyclohexyl-3-aminopropyl silyl n-(2-aminoethyl)-3-amino proprylmethyl silyl n-cyclohexylaminomethyl silyl bis (silylpropyl)-n-methylamine

3-aminopropyl diisopropyl silyl (3-aminopropyl) silyl propanesulfonic acid silyl carboxyethyl silyl tris (silylmethyl) amine

N-(hydroxyethyl)-N,N-bis(silylpropyl)amine 2-(4-pryidylethyl)silyl

Z is independently selected from $C_1$-$C_6$)alkoxy, —NH($C_1$-$C_6$)alkyl, —N(($C_1$-$C_6$)alkyl)$_2$, OH, halo, or an attachment point to Formula I. At least one Z is the attachment point to Formula I. Therefore, the charge modifier is covalently bound to the alkylsilyl coating of Formula I by a silyl ether moiety. A corresponding charge modifying reagent can be used to obtain the charge modifier of the final coating product, for example, the charge modifying reagent can be trimethoxy silyl propyl methyl phosphonate or N,N-(diethylaminopropyl) trimethoxysilane, or 2-(4-pyridylethyl)triethoxysilane.

In some embodiments, a single charge modifier is applied to the vapor deposited alkylsilyl(Formula I). In other embodiments, multiple charge modifiers are applied to the vapor deposited alkylsilyl(Formula I). The multiple charge modifiers can be the same charge modifier applied at multiple X positions of Formula I. Alternatively, the multiple charge modifiers can be different charge modifiers applied at different X positions of Formula I.

In some embodiments, a vapor deposition alylsilyl coating can be deliberately doped with a charged surface modifier ($R^C$), for example, the charged surface modifiers of U.S. Pat. No. 10,159,911 issued Dec. 25, 2018 and entitled "High Purity Chromatographic Materials Comprising an Ionizable Modifier," the entire contents of which is hereby incorporated by reference.

The charge modifier ($R^C$) can have a surface coverage of between about 0.01 μmol/m$^2$ to about 10 μmol/m$^2$. In some embodiments, the charge modifier ($R^C$) has a surface coverage of between about 0.02 µmol/m² to about 1 µmol/m². In some embodiment, the charge modifier ($R^C$) has a surface coverage of between about 0.1 µmol/m² to about 1 µmol/m².

An example of an active coating having an alkylsilyl coating of Formula I with a charge modifier ($R^C$) that can result from coating #3 of FIG. 2 is shown below. Although the final alkylsilyl coating shown below has multiple points for other charge modifiers ($R^C$) those points could also be $C_1$-$C_6$)alkoxy, —NH($C_1$-$C_6$)alkyl, —N(($C_1$-$C_6$)alkyl)$_2$, OH, or a halo, as described herein. In addition, although the final alkylsilyl coating shown below has multiple points for other charge modifiers ($R^C$) those points could also be a hydrophobicity modifier ($R^B$) and/or chelators or crown ethers. The charge modifiers ($R^C$) shown below can also be other points of attachment to the surface of the chromatographic flow path, i.e., $R^A$.

Hydrophobicity Modifier ($R^B$)

In some embodiments, the alkysilyl coating with a charge modifier ($R^C$) is combined with a hydrophobicity modifier ($R^B$). The hydrophobicity modifier can have a net neutral charge. Encompassed within the reagent choices of a hydrophobicity modifier are zwitterionic modifiers, such as carboxy- and sulfobetaine reagents. A zwitterionic modifier affords a macroscopically, net neutral surface, but also lends microscopic Coulombic effects that can be repulsive to a wide range of analytes, including those with diverse charge characteristics.

The hydrophobicity modifier ($R^B$) can have a surface coverage between about 0.01 0.01 µmol/m² to about 10 µmol/m². In some embodiments, the hydrophobicity modifier ($R^B$) has a surface coverage of between about 0.03 µmol/m² to about 0.9 µmol/m². In some embodiments, the hydrophobicity modifier ($R^B$) has a surface coverage of between about 0.5 µmol/m² to about 3 µmol/m².

The hydrophobicity modifier ($R^B$) is attached to Formula I by a silyl ether moiety and has a composition selected the from one or more of the following:

n-decyl silyl between water and acetonitrile based mobile phases are applied with acid modifiers of varying acidity, hydrophobicity, and ion pairing strength. Formic acid modified mobile phases are particularly useful in this regard as it does not attenuate electrostatic effects. This can be particularly useful when separating, for example, peptides, assays for citric acid cycle metabolites and glycans. Hydrophobicity modifiers, in combination with the charge modifiers, can also be used in hydrophilic interaction chromatography.

An example of an active coating having an alkylsilyl coating of Formula I with a charge modifier ($R^C$) and a hydrophobicity modifier ($R^B$) that can result from coating #4 of FIG. 2 is shown below. Although the resulting coating shown below has multiple charge modifiers ($R^C$) any or all of those points could be a hydrophobicity modifier ($R^B$) or $C_1$-$C_6$)alkoxy, —NH($C_1$-$C_6$)alkyl, —N(($C_1$-$C_6$)alkyl)$_2$, OH, or a halo or chelators or crown ethers, as described herein. In some embodiments, the charge modifier ($R^C$) and a hydrophobicity modifier ($R^B$) need not be directly linked, for example, the charge modifier ($R^C$) and a hydrophobicity modifier ($R^B$) can be connected through one or more bridging silicon moieties with Y (as defined herein) chemical compositions.

Z is independently selected from ($C_1$-$C_6$)alkoxy, —NH($C_1$-$C_6$)alkyl, —N(($C_1$-$C_6$)alkyl)$_2$, OH, halo, or an attachment point to Formula I. At least one Z is the attachment point to Formula I. Therefore, the hydrophobicity modifier is covalently bound to the alkylsilyl coating of Formula I by a silyl ether moiety. A corresponding hydrophobicity modifying reagent can be used to obtain the charge modifier of the final coating product, for example, the charge modifying reagent can be (3-glycidyloxypropyl)trimethoxysilane, hydrolyzed (3-glycidyloxypropyl)trimethoxysilane, n-decyltrichlorosilane, or N-(3-trimethoxysilylpropyl)gluconamide.

Several coatings corresponding to exemplary embodiments of the technology are shown in FIG. 2. These coatings include coatings having only a charge modifier ($R^C$), for example coating #s 1 and 3, as well as coatings having both a charge modifier ($R^C$) and a hydrophobicity modifier ($R^B$), for example coating #s 2, 4, and 5.

Hydrophobicity modifiers, in combination with the charge modifiers, can be used to add a subtle, but well controlled secondary interaction. Molecules that might otherwise co-elute as a consequence of having near identical hydrophobicities can pass through, for example a frit coated with coating #4 shown in FIG. 2, where the molecule can experience subtle ion exchange partitioning when a gradient Chelators and Crown Ethers ($R^D$)

In some embodiments, the alkysilyl coating with a charge modifier ($R^C$) is combined with an ion scavenging ligand, for example a chelator or crown ether. The chelator can be, for example, ethylenediaminetetraacetic acid or etidronic acid. The crown ether can be, for example, 18-crown-6, 12-crown-4, 15-crown-5, dibenzo-18-crown-6, or diaza-18-crown-6.

The chelators and crown ethers can be attached covalently to a silanized/alkylsilyl coating, either through direct covalent attachment or through the use of secondary linker moieties. The chelators and crown ethers can scavenge ions, for example, $Ca^{2+}$, $Fe^{3+}$ and/or $K^+$ that can be present in mobile phases, flow paths, and systems, which result in undesired gas phase ion adducts and cause the fouling and decommissioning of the mass spectrometer. For example, the chelator or crown ether can pull metal ions out of the mobile phase to improve MS spectra. Often, even MS grade mobile phases will contain trace amounts of metal ions, such as sodium and potassium, and it is common for the quality of the mass spectra to suffer, as a result. A 50 ppb concentration of potassium can yield a 2 to 10% relative intensity of potassiated adduct ion. An active coating such as this can sequester these metal ions, ensuring they are not present in the chromatographic effluent upon ionization. In turn, mass spectra can be obtained with ion adduct signals below 2% relative intensity even when mobile phases with questionable purity are employed. This type of coating can be used prior to an injector and post column in the flow path.

In some embodiments, the chelator and crown ethers can be combined directly with the alkylsilyl coating of Formula I, without a charge modifier being present.

In some embodiments, the chelators and crown ethers can also be used in conjunction with the hydrophobicity modifiers described herein. In some embodiments, the chelators and crown ethers can be used in conjunction with both the charge modifiers and hydrophobicity modifiers described herein.

Therefore, when chelators and/or crown ethers are used as an active coating, a chromatographic device for separating analytes in a sample includes a sample injector having a sample injection needle for injecting the sample into the mobile phase, a sample reservoir container in fluid communication with the sample injector, a chromatography column downstream of the sample injector, the chromatography column having fluid connectors, and fluid conduits connecting the sample injector and the chromatography column. Interior surfaces of the fluid conduits, sample injector, sample reservoir container, and chromatography column form a fluidic flow path having wetted surfaces. At least a portion of the wetted surfaces of the fluidic flow path are coated with an alkylsilyl coating having the Formula I:

(I)

wherein each X is independently selected from $(C_1-C_6)$ alkoxy, $-NH(C_1-C_6)alkyl$, $-N((C_1-C_6)alkyl)_2$, OH, $OR^A$, $R^B$, $R^C$, $R^D$ and halo. $R^A$ represents a point of attachment to the interior surfaces of the fluidic system and at least one X is $OR^A$. $R^B$ is absent or represents a hydrophobicity modifier. $R^C$ is absent or represents a charge modifier. $R^D$ represents a chelator, or a crown ether, and at least one X is $R^D$. Y is a bridging moiety selected from $(C_1-C_{20})alkyl$, $-O[(CH_2)_2O]_{1-20}-$, $-(C_1-C_{10})[NH(CO)NH(C_1-C_{10})]_{1-20}-$, or $-(C_1-C_{10})[alkylphenyl(C_1-C_{10})alkyl]_{1-20}-$.

Bacteriostatic Modifiers

In some embodiments, a chromatographic device for separating analytes in a sample includes a mobile phase reservoir, a mobile phase pump in communication with the mobile phase reservoir, a mobile phase inlet line have a first end in communication with the mobile phase reservoir and a second end in communication with the mobile phase pump, and a sinker at the first end of the mobile phase inlet line. Interior surfaces of the mobile phase reservoir, the mobile phase pump and the mobile phase inlet line form a fluidic flow path having wetted surfaces. Exterior surfaces of the sinker also have wetted surfaces, which are in contact with the mobile phase. At least a portion of the wetted surfaces in contact with the mobile phase are coated with an alkylsilyl coating having the Formula I:

(I)

wherein each X is independently selected from $C_1-C_6$) alkoxy, $-NH(C_1-C_6)alkyl$, $-N((C_1-C_6)alkyl)_2$, OH, $OR^A$, $R^B$, $R^C$, $R^D$, $R^E$, and halo. $R^A$ represents a point of attachment to the interior surfaces of the fluidic system and at least one X is $OR^A$. $R^B$ is absent or represents a hydrophobicity modifier. $R^C$ is absent or represents a charge modifier. $R^D$ is absent or represents a chelator, or a crown ether. $R^E$ is a bacteriostatic moiety, and at least one X is $R^E$. Y is a bridging moiety selected from $(C_1-C_{20})alkyl$, $-O[(CH_2)_2O]_{1-20}-$, $-(C_1-C_{10})[NH(CO)NH(C_1-C_{10})]_{1-20}-$, or $-(C_1-C_{10})[alkylphenyl(C_1-C_{10})alkyl]_{1-20}-$.

In some embodiments, the bacteriostatic moiety is a zwitterion. The zwitterionic coatings can be prepared by silanization with bis(trichlorosilyl)ethane followed by derivatization with N,N-(diethylaminopropyl)trimethoxysilane and subsequent reactions with chloro or bromo alkylcarboxylic acids. In some embodiments, the bacteriostatic moiety is a quaternary amine.

In some embodiments the bacteriostatic coating is applied to all components within the flow path including inlet filters, inlet mobile phase lines, pumps, transfer lines, sample syringes, frits and mobile phase containers (see, e.g., FIG. 1) to provide systemic protection against bacterial growth and premature column failure.

The bacteriostatic moiety can be used alone, or in conjunction with a charge modifier, a hydrophobicity modifier and/or a chelator or crown ether.

Surfactants

In some embodiments, surfactants can be used as an active coating to solubilize proteins, including hydrophobic membrane proteins, and provide a denaturing environment that facilitates enzyme reactions, such as proteolysis and glycan release.

A chromatographic device for separating analytes in a sample includes a sample injector having a sample injection needle for injecting the sample into the mobile phase, a sample reservoir container in fluid communication with the sample injector, a chromatography column downstream of the sample injector, the chromatography column having fluid connectors, and fluid conduits connecting the sample injector and the chromatography column. Interior surfaces of the fluid conduits, sample injector, sample reservoir container, and chromatography column form a fluidic flow path having wetted surfaces. At least a portion of the wetted surfaces of the fluidic flow path are coated with an alkylsilyl coating having the Formula I:

(I)

wherein each X is independently selected from $(C_1-C_6)$ alkoxy, $-NH(C_1-C_6)alkyl$, $-N((C_1-C_6)alkyl)_2$, OH, $OR^A$, $R^B$, $R^C$, $R^D$, $R^E$, $R^F$, and halo. $R^A$ represents a point of attachment to the interior surfaces of the fluidic system and at least one X is $OR^A$. $R^B$ is absent or represents a hydrophobicity modifier. $R^C$ is absent or represents a charge modifier. $R^D$ is absent or represents a chelator, or a crown ether. $R^E$ is absent or represents a bacteriostatic moiety. $R^F$ represents a surfactant, and at least one X is $R^F$. Y is a bridging moiety selected from $(C_1-C_{20})alkyl$, $-O[(CH_2)_2O]_{1-20}-$, $-(C_1-C_{10})[NH(CO)NH(C_1-C_{10})]_{1-20}-$, or $-(C_1-C_{10})[alkylphenyl(C_1-C_{10})alkyl]_{1-20}-$.

In some embodiments, the surfactant ($R^F$) is sodium dodecyl sulfate, zwittergent 3-10 (Decyldimethylammonio) propanesulfonate, sodium deoxycholate, hexadecyl trimethyl ammonium bromide, triton, polysorbate, or a combination thereof.

Methods

The devices and alkylsilyl coatings described herein can be used in chromatographic methods to separate analytes in a sample. In general, the method includes introducing a sample including the analytes into a chromatographic system (e.g., a liquid chromatography system). The chromatographic system includes a flow path disposed in an interior of the chromatographic system where at least a portion of the flow path has an active coating. The chromatographic system also includes a chromatographic column that has a stationary phase material in an interior of the chromatographic column that facilitates separation of the analytes in the sample through interaction with at least one analyte in the sample. For example, the chromatographic system can be the chromatographic system of FIG. 1 as described in detail herein.

The active coating is selected to interact with at least one analyte in the sample. The interaction can be through repulsive forces, a secondary interaction, or a retention mechanism distinct from the interaction with the stationary phase material. The secondary interaction can be ion exchange partitioning.

The analyte and the active coating can be negatively charged. The analyte and the active coating can be positively charged. When the analyte and the active coating both have the same charge, the active coating repels the analyte and shields the analyte from interacting with the substrate (e.g., a metal chromatographic column or frit).

The active coating can be applied to the flow path via vapor deposition. The active coating can be applied to a frit. The frit can be positioned at an inlet, an outlet or at both an inlet and outlet of the chromatographic column (see FIG. 1). The active coating can be any of the coating described herein.

The technology includes a method of separating a sample comprising an anionic compound. The method includes introducing the sample comprising the anionic compound to a fluidic system including a flow path disposed in an interior of the fluidic system wherein at least a portion of the flow path includes an alkylsilyl coating of Formula I (as described herein) with a negatively-charged modifier. The sample is eluted through the fluidic system and the anionic compound is repelled by a negatively-charged modifier. The method also includes isolating the anionic compound. The anionic compound can be, for example, a nucleic acid or an oligonucleotide. The alkylsilyl coating can be, for example, coating #1 shown in FIG. 2 (bis(trichlorosilyl) ethane followed by trimethoxy silyl propyl methyl phosphonate). This method can be used to analyze nucleic acids or oligonucleotides at a pH above their isoelectric point.

Similarly, the method can be applied to samples comprising cations where the alkylsilyl coating of Formula I (as described herein) has a positively-charged modifier.

The technology also includes a method of separating a sample comprising peptides. The method includes introducing the sample comprising the peptides into a chromatography column having a hydrophobic stationary phase disposed within the chromatography column and a frit at an outlet of the chromatography column. In some embodiments, the hydrophobic stationary phase is a bridged ethylene hybrid C18 stationary phase. The frit is coated with an alkylsilyl coating of Formula I (as described herein) where the alkylsilyl coating has both a charge modifier and a hydrophobicity modifier. The charge modifier has a surface coverage of between about 0.03 µmol/m² to about 0.9 µmol/m² and the hydrophobicity modifier has a surface coverage of between about 0.5 µmol/m² to about 3 µmol/m². The method also includes eluting the sample through the chromatography column and isolating the peptides.

The charge modifier can be N,N-(diethylaminopropyl) silyl and the hydrophobicity modifier can be n-decyl silyl (i.e., coating #4 in FIG. 2). In some embodiments, the charge modifier, N,N-(diethylaminopropyl)silyl, accounts for 10% of the surface coverage and the hydrophobicity modifier, n-decyl silyl, accounts for 90% of the surface coverage. Other ratios and percentages of surface coverage of the charge modifier and hydrophobicity modifier can be used.

The peptides can be an Asp and iso ASP isomeric peptide pair. The method can also include partitioning the Asp and iso ASP isomeric peptide pair on the coated frit.

The sample can include trypsinized immunoglobulin. In some embodiments, the trypsinized immunoglobulin is trastuzumab.

The technology also includes a method of separating a sample comprising proteins. The method includes introducing the sample comprising proteins into a chromatography column having a hydrophobic stationary phase disposed within the chromatography column and a frit at an inlet of the chromatography column. In some embodiments, the hydrophobic stationary phase is a bridged ethylene hybrid C4 stationary phase. The frit is coated with an alkylsilyl coating of Formula I (as described herein) having a charge modifier with a surface coverage of between about about 0.1 µmol/m² to about 3 µmol/m². In some embodiments, the charge modifier is silyl propyl methyl phosphonate (i.e., coating #1 in FIG. 2). The alkylsilyl coating used in this method does not have a hydrophobicity modifier. The method also includes eluting the sample through the chromatography column and isolating the proteins.

The method can also include flowing a mobile phase having an ionic strength through the chromatography column such that the proteins are retained on the frit. The ionic strength of the mobile phase can be increased to displace a portion of the proteins from the frit. The method also includes eluting the displaced proteins through the chromatography column.

In another embodiment, the method includes coating flow paths prior to analyte introduction with a coating having a bactiostatic moiety as described herein. The flow path includes, for example, a mobile phase reservoir, mobile phase inlet lines, mobile phase pump, and a sinker. In some embodiments, the bacteriostatic coating in included along portions or the entirety of the flow path of a chromatographic system.

In some embodiments, the method includes coating at least a portion of a flow path of a chromatographic system with a coating having a surfactant, as described herein.

Kits

The technology also includes kits. The kits include a chromatographic components, for example, a chromatographic column, that has been coated with an alkylsilyl coating of Formula I, as described above. Other components can be provided in the kit that can also include the coatings described herein, for example, tubing, frits, and/or connectors. The kit can also include instructions for separating analytes, for example, biomolecules, proteins, glycans, peptides, oligonucleotides, pesticides, bisphosphonic acids, anionic or cationic compounds, and zwitterions like amino acids and neurotransmitters.

EXAMPLES

Example 1: Analyte-Specific Repulsive Coating and an Apparatus for the Analysis of Oligonucleotides This is an example of an analyte-specific repulsive coating and an apparatus for the analysis of oligonucleotides. An active coating can be designed such that it bears the same charge as an analyte of interest. A coating devised for such an application is described in FIG. 2 (Coating #1). This coating can be constructed through silanization with bis(trichlorosilyl)ethane followed by trimethoxy silyl propyl methyl phosphonate. Once applied to the needle, column housing, frits and pre- and post-column tubing (see, e.g., FIG. 1), this coating yields a flow path in which all surfaces actively repel anionic compounds. In practice, this flow path can confer an LC system that could be dedicated to the separation of certain analytes, such as nucleic acids or oligonucleotides. These types of analytes are polyanions and notoriously prone to adsorbing onto metal surfaces. It can be predicted that opposite charge compounds can adsorb to the coating in time and with routine sample injections. Nevertheless, it is believed that these adsorbed molecules will equilibrate to afford a surface that itself also exhibits low bind properties for the oligonucleotides. Because of this dynamic equilibrium, the surface charge must be deliberately selected and optimized.

Example 2: Selectively Enhancing Coated Flow Path Components and Method for the Analysis of Citric Acid Cycle Metabolites and Asp/Iso Asp Peptide Isomers This is an example of a selectivity enhancing coated flow path component and method for the analysis of citric acid cycle metabolites and Asp/iso Asp peptide isomers. An active coating can be employed to enhance the selectivity of a separation. Many chromatographic applications are challenged to produce a separation between critical components, such as the acids of a citric acid cycle panel or the Asp/Iso Asp peptide isomers in an immunoglobulin proteolytic digest. To that end, a charge-modified, active coating can be combined with certain chromatographic modes and columns to achieve more effective, tailored separations. In one aspect, a surface modified with a basic, charge bearing moiety would be ideal for this application, such as a coating formed via silanization with bis(trichlorosilyl)ethane followed by a low coverage of N,N-(diethylaminopropyl)trimethoxysilane and high coverage of n-decyl trichlorosilane (i.e., FIG. 2, Coating #4). In which case, ideal coverage of N,N-(diethylaminopropyl)trimethoxysilane would correspond to 0.03 to 0.9 $\mu mol/m^2$ and ideal coverage for n-decyl trichlorosilane would correspond to 0.5 to 3 $\mu mol/m^2$.

A high surface area component of the flow path can be selected for use as a selectivity enhancer, lest its surface area be too insignificant to make a difference to the retentivity or selectivity of the overall separation apparatus. For this reason, the frit of a liquid chromatography (LC) column housing can be modified to exhibit an active coating and advantageously used as a selectivity enhancer to add a subtle, yet well controlled secondary interaction. In one exemplary embodiment, a 0.2 μm porosity stainless steel frit is modified with Coating #4 of FIG. 2 and used in the outlet of an ACQUITY® UPLC® Peptide BEH C18 130 Å 1.7 μm 2.1×150 mm column (commercially available from Waters Technologies Corporation, Milford, MA). Optionally, this coated frit can be constructed into a column format with special design features amenable to the swapping and replacement of the high surface area selectivity enhancer. A sample of trypsinized immunoglobulin, such as trastuzumab, gets loaded onto the column and then a gradient between water and acetonitrile based mobile phases is applied. Acid modifiers of varying acidity, hydrophobicity and ion pairing strength can be applied, though formic acid modified mobile phases are particularly attractive in that they do not attenuate electrostatic effects. Peptides that might co-elute as a consequence of having near identical hydrophobicities will pass through the selectivity enhancer wherein they will experience subtle ion exchange partitioning. In the case of an Asp and iso Asp isomeric peptide pair, the iso Asp containing species will be partitioned and thus be retained more extensively than the Asp containing species, given that an iso Asp residue is slightly more acidic (pKa 3.1 versus 3.9). This method is equally applicable to numerous other types of separations, including assays for citric acid cycle metabolites and glycans. In other embodiments, an acidic, cation exchange selectivity enhancer can be employed. In yet other embodiments, the selectivity enhancer can be used with hydrophilic interaction chromatography (HILIC).

Example 3: Active Coating with Orthogonal Retentivity to Perform Multidimensional Chromatography This is an example of an active coating with orthogonal retentivity to perform multidimensional chromatography. An active coating can also be used to facilitate multidimensional chromatography. Like with the selectivity enhancer, a high surface area flow component, like a frit, makes for a preferred substrate. Unlike the selectivity enhancer, it is intended for this active coating to strongly retain a class of analytes by a retention mechanism that is orthogonal to that of the implemented LC column. Though this coating can be implemented at any location in the flow path, it is advantageous to consider it being incorporated at the head (inlet) of the column. Analytes adsorb to this flow path component, are eluted to a downstream LC column in a gradient or set of discrete mobile phase changes and secondary gradients across the packed bed of the LC column are thereafter performed. In one aspect, a surface modified with a strongly acidic, charge bearing moiety would be ideal for this application, such as a coating formed via silanization with bis(trichlorosilyl)ethane followed by trimethoxy silyl propyl methyl phosphonate. For this application, ideal coverage for trimethoxy silyl propyl methyl phosphonate would correspond to 0.1 to 3 $\mu mol/m^2$.

For instance, in one exemplary embodiment, a 0.2 μm porosity stainless steel frit is modified with a version of Coating #1 of FIG. 2 having a high coverage of trimethoxy silyl propyl methyl phosphonate (2 $\mu mol/m^2$) and is used in the inlet of an ACQUITY® UPLC® Peptide BEH C18 130 Å 1.7 μm 2.1×150 mm column (commercially available from Waters Technologies Corporation, Milford, MA). A proteolyzed protein sample gets loaded onto the column under aqueous, low ionic strength conditions. By way of cation exchange, the peptides are thus retained on the inlet frit. An increase in mobile phase ionic strength can then be employed to displace a subset of the peptides (the least basic) onto the packed bed of the LC column. A gradient between water and acetonitrile is thereafter applied to elute the displaced peptides and thereby obtain a second dimension chromatogram. This process is continued with steps of increasing ionic strength until the entirety of the sample is profiled. Again, this method is equally applicable to numerous other types of separations and analytes, not only peptides and proteolyzed proteins. It is also applicable to use with a HILIC LC column.

Example 4: Active Coating with Ion Scavenging Ligands

This is an example of an active coating with ion scavenging ligands. A coated flow path component can be modified to bear ion scavenging ligands, such as chelators or crown ethers. For liquid chromatography to be most effective when hyphenated with mass spectrometry, it is necessary for the mobile phases, flow paths and systems to be free of non-volatile ions that when present can yield undesired gas phase ion adducts, if not cause the fouling and decommissioning of the mass spectrometer.

A number of chemical compounds show a capacity to sequester metal ions, whether they be alkali, alkaline earth and transition metals. Chelators, such as ethylenediaminetetraacetic acid and etidronic acid, are ubiquitously used in solutions to scavenge $Ca^{2+}$ and Fe3+. In addition, crown ethers can be used to selectively coordinate certain cations with high affinity. 18-crown-6, for instance, is widely recognized for its high affinity for potassium ($K^+$) ions. In some aspects of this invention, these ligands can be attached covalently to a silanized/alkylsilyl coating, either through direct covalent attachment or through the use of secondary linker moieties.

In one example, a 0.2 μm porosity stainless steel frit is modified with bis(trichlorosilyl)ethane coating, which is then subsequently derivatized with a crown ether, including but not limited to 18-crown-6, 12-crown-4, 15-crown-5, dibenzo-18-crown-6, and diaza-18-crown-6. This frit can be used as the outlet of an LC column or in a separate vessel to scavenge for impurity metal cations that might be present in mobile phases or leaching from an instrument flow path. In using this invention, it would be possible to minimize the formation of sodium and potassium analyte adduct ions that are otherwise regularly encountered in the positive ion mode electrospray MS spectra of various types of molecules, including by not limited to peptides, glycans, and proteins Example 5: Active Coating with Bacteriostatic Properties This is an example of an active coating with bacteriostatic properties. In liquid chromatography, mobile phases with pH values in the physiological range that do not contain organic solvent will readily support microbial growth. Although it is recommended that mobile phases be changed frequently to prevent the buildup of bacteria on surfaces, especially in aqueous mobile phases, customers typically do not do this in practice. Microbial contamination of the LC system can cause column fouling, resulting in an unacceptable separation and will result in premature failure of the column.

An active coating devised to be a bacteriostatic agent represents an ideal solution because the agents can be applied to all components within the flow path including inlet filters, inlet mobile phase lines, pumps, transfer lines, sample syringes, frits and mobile phase containers (see, e.g., FIG. 1) to provide systemic protection against bacterial growth and premature column failure.

In one embodiment, zwitterionic coatings can be prepared by silanization with bis(trichlorosilyl)ethane followed by derivatization with N,N-(diethylaminopropyl)trimethoxysilane and subsequent reactions with chloro or bromo alkylcarboxylic acids. Quaternary amines have been shown to have potent antimicrobial activity and can be applied to the surface of frits or degasser lines to reduce or eliminate growth thus avoiding premature column failure. While not limited to theory, it is believed that quaternary amine and zwitterion containing active coatings disrupt the formation lipid bilayers and thereby interfere in an integral mechanism of biological growth. In some embodiments, bacteriostatic coatings are employed in regions prior to analyte injection, for example, sinkers and mobile phase inlet lines.

Example 6: Active Coating with Surfactants

This is an example of an active coating with surfactants. Surfactants are used to solubilize proteins, including hydrophobic membrane proteins, and provide a denaturing environment that facilitates enzyme reactions, such as proteolysis and glycan release. In practice, the use of ionic surfactants in LC/MS analysis is discouraged due to the reduction of analyte signal observed because of the highly charged nature of the surfactant. This problem can be alleviated by the use of surfactants that are tethered to a device (or coated on a device) and not prone to release into the MS system. This MS friendly solution would enable single step online protein digestion in a system where the surfactant is tethered and cannot be released into the MS instrument coupled to an immobilized trypsin or other proteolytic enzyme column. Surfactant moieties with desirable properties include, but are not limited to, sodium dodecyl sulfate, zwittergent 3-10 (Decyldimethylammonio) propanesulfonate, sodium deoxycholate, hexadecyl trimethyl ammonium bromide, triton and polysorbate. In an alternative embodiment, chaotropic moieties can be incorporated into the active coating and can consist of chemical structures with chemical similarity to guanidine and urea. In each of these examples, the active coating will induce the denaturation of a protein analyte through manipulating its entropically driven, hydration based folding.

While this disclosure has been particularly shown and described with reference to example embodiments thereof, it will be understood by those skilled in the art that various changes in form and details may be made therein without departing from the scope of the technology encompassed by the appended claims.

What is claimed is:

1. A method of separating analytes in a sample, the method comprising:
    introducing a sample comprising the analytes into a chromatographic system comprising:
        metallic flow path components disposed in an interior of the chromatographic system defining a flow path, at least a portion of the metallic flow path components having an active coating; and
        a chromatographic column having a stationary phase material in an interior of the chromatographic column that facilitates separation of the analytes in the sample through interaction with at least one analyte in the sample, wherein the stationary phase material is distinct from the metallic flow path components;
    wherein the metallic flow path components having the active coating are not inert to the analytes; and wherein the active coating comprises an alkylsilyl coating of Formula I:

wherein each X is independently selected from $(C_1-C_6)$ alkoxy, $-NH(C_1-C_6)$alkyl, $-N((C_1-C_6)$alkyl$)_2$, OH, $OR^A$, $R^B$, $R^C$, $R^D$ and halo;

$R^A$ represents a point of attachment to the interior surfaces of the fluidic system and at least one X is $OR^A$;

$R^B$ is absent or represents a hydrophobicity modifier;

$R^C$ represents a charge modifier and at least one X is $R^C$;

$R^D$ is absent, a chelator, or a crown ether; and

Y is a bridging moiety selected from $(C_1-C_{20})$alkyl, $-O[(CH_2)_2O]_{1-20}-$, $-(C_1-C_{10})[NH(CO)NH(C_1-C_{10})]_{1-20}-$, or $-(C_1-C_{10})[alkylphenyl(C_1-C_{10})alkyl]_{1-20}-$.

2. The method of claim 1, wherein the active coating is applied to the flow path by vapor deposition.

3. The method of claim 1, wherein the active coating is applied to a frit.

4. The method of claim 3, wherein the frit is positioned at an outlet of the chromatographic column.

5. The method of claim 3, wherein the frit is positioned at an inlet of the chromatographic column.

* * * * *